(12) United States Patent
Fredericks et al.

(10) Patent No.: US 6,431,728 B1
(45) Date of Patent: Aug. 13, 2002

(54) MULTI-ARRAY LED WARNING LIGHTS

(75) Inventors: Thomas M. Fredericks, Westbrook; James L. Stopa, Old Saybrook, both of CT (US)

(73) Assignee: Whelen Engineering Company, Inc., Chester, CT (US)

(*) Notice: Subject to any disclaimer, the term of this patent is extended or adjusted under 35 U.S.C. 154(b) by 0 days.

(21) Appl. No.: 09/610,137

(22) Filed: Jul. 5, 2000

(51) Int. Cl.[7] ............................................... F21V 21/00
(52) U.S. Cl. ..................... 362/249; 362/240; 362/800; 340/901
(58) Field of Search ................................ 362/555, 249, 362/800; 363/236, 240; 340/901, 945

(56) References Cited

U.S. PATENT DOCUMENTS 5,567,036 A * 10/1996 Theobald et al. ........... 362/280
5,585,783 A * 12/1996 Hall ............................ 340/473
5,806,965 A *  9/1998 Deese ......................... 362/249
6,244,728 B1 *  6/2001 Cote et al. .................. 362/249

* cited by examiner

*Primary Examiner*—Sandra O'Shea
*Assistant Examiner*—John Anthony Ward
(74) *Attorney, Agent, or Firm*—Alix, Yale & Ristas, LLP

(57) ABSTRACT

A warning light has multiple juxtapositioned arrays of light emitting diodes, each of the arrays defining a plane oriented transversely to the parallel axes of the lenses of the diodes comprising the array. The arrays are supported so that the planes defined thereby angularly intersect. The radiation pattern of the light is controlled by selection of the diodes comprising each array and adjustment of the angles of intersection of the array defined planes.

37 Claims, 5 Drawing Sheets

MULTI-ARRAY LED WARNING LIGHTS

BACKGROUND OF THE INVENTION

1. Field of the Invention

The present invention relates to the generation of focused, high intensity light and, particularly, to warning lights comprised of multiple, closely spaced arrays of light emitting diodes. This invention is also directed to techniques for the fabrication of directional light sources, which produce highly visible radiation and, especially, to warning lights having plural arrays of light emitting diodes which define angularly intersecting planes. Accordingly, the general objects of the present invention are to provide novel and improved methods and apparatus of such character.

2. Description of the Prior Art

Recent improvements in light emitting diodes (LED's), particularly the ability of such solid state devices to generate relatively high light flux, has permitted use of LED's in warning lights. Restated, presently available LED's, when grouped together to form a closely spaced array and energized simultaneously and periodically have the capability of producing pulses of light which, when appropriately directed, are of sufficiently high intensity to be highly conspicuous. However, LED's have characteristics which result in the light generated by a closely spaced array of such devices being inefficiently utilized. Specifically, LED's inherently include an integral plastic lens which defines the radiation pattern of the device. This radiation pattern is generally conical with the maximum intensity being on-axis. LED's are, in fact, conventionally identified by a product number which includes an angle of divergence, with respect to the axis of the integral lens of the device, where the measured light flux is one-half that which is measured on-axis.

The environment of a warning light, i.e., installation on an emergency vehicle or aircraft, imposes relatively harsh operating conditions on a light source. It has, in the past, been thought necessary to mount all of the LED's of an array of such devices intended for use in a warning light on a single circuit board and to encapsulate the thus formed planar array to thereby produce a rugged, unitary light source assembly.

Warning lights must meet technical requirements established by government agencies, the FAA for example, which specify a light radiation pattern, including the field of illumination. These light radiation pattern specifications are stated in terms of light intensity at various angles, measured both horizontally and vertically, with respect to a horizontal axis defined by the warning light. In the past, in order to comply with most of the established specifications, it was necessary to focus the light generated by a planar array of LED's. The requisite focusing was, at least in part, achieved through the use of a lens disposed between the LED array and the plane in which the light intensity measurements were made. Thus, the light generated by the individual LED's was caused to pass through at least two lenses, i.e., the integral lens of each LED and a further lens positioned in front of the LED array. A lens inherently causes attenuation of the light passing therethrough. In order to compensate for this attenuation, it was previously believed necessary to either employ more LED's in the array, thus increasing the physical size and power requirements of the warning light, or to sacrifice LED service life by increasing the excitation current to boost light output.

SUMMARY OF THE INVENTION

The present invention overcomes the above-briefly discussed and other deficiencies and disadvantages of the prior art by providing novel and improved warning lights which utilize multiple juxtapositioned arrays of closely spaced light emitting diodes. Each of the diode arrays defines a plane oriented substantially transverse to the axes of the integral lenses of the individual diodes comprising the array. In the final assembly, the arrays are closely spaced and oriented such that the planes defined thereby intersect at angles. Thus, by judicious selection of the LED's comprising each array and the angles of intersection of the array defined planes, the radiation pattern prescribed by a specification may be satisfied without the necessity of passing the light generated by each individual LED through at least two focusing lenses.

The invention also encompasses manufacturing techniques which facilitate formation of the multiple LED arrays comprising a light source and assembly methods for establishing the appropriate relative orientation of the multiple arrays.

BRIEF DESCRIPTION OF THE DRAWINGS

The present invention may be better understood, and its numerous objects and advantages will become apparent to those skilled in the art, by reference to the accompanying drawings wherein like reference numerals refer to like elements in the several figures and in which.

DESCRIPTION OF THE DISCLOSED EMBODIMENTS

Figure 1:
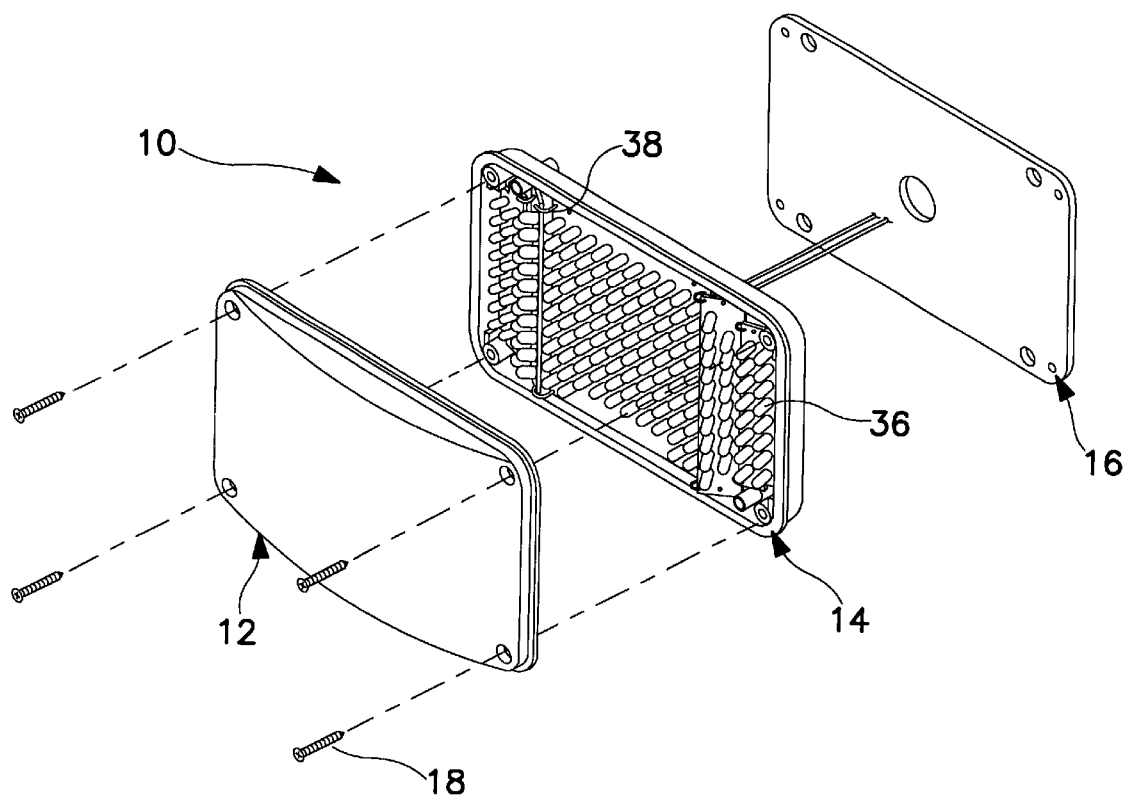
FIG. 1 is an exploded, perspective view of a warning light for an emergency vehicle in accordance with the present invention.

A warning light in accordance with a first embodiment of the invention is indicated generally at 10 in FIG. 1. Warning light 10 comprises three principle components, namely a "dust cover" 12, a light source 14, and a gasket 16. When the warning light, which is also referred to in the trade as a lighthead, is mounted on an emergency vehicle, for example through employment of the four mounting screws 18, gasket 16 will be compressed between the back of light source 14 and the exterior of the vehicle thus establishing a hermetic seal. Dust cover 12 engages light source 14 in such a manner as to establish a seal against the migration of dirt and moisture into the space between the dust cover and light source. Dust cover 12 thus further protects light source 14 from the ambient environment and, in so doing, provides a smooth surface which may be easily cleaned. Dust cover 12 preferably does not include optics but may, if necessary for the particular use, be tinted to impart a desired color to the radiated light.

Figure 2:
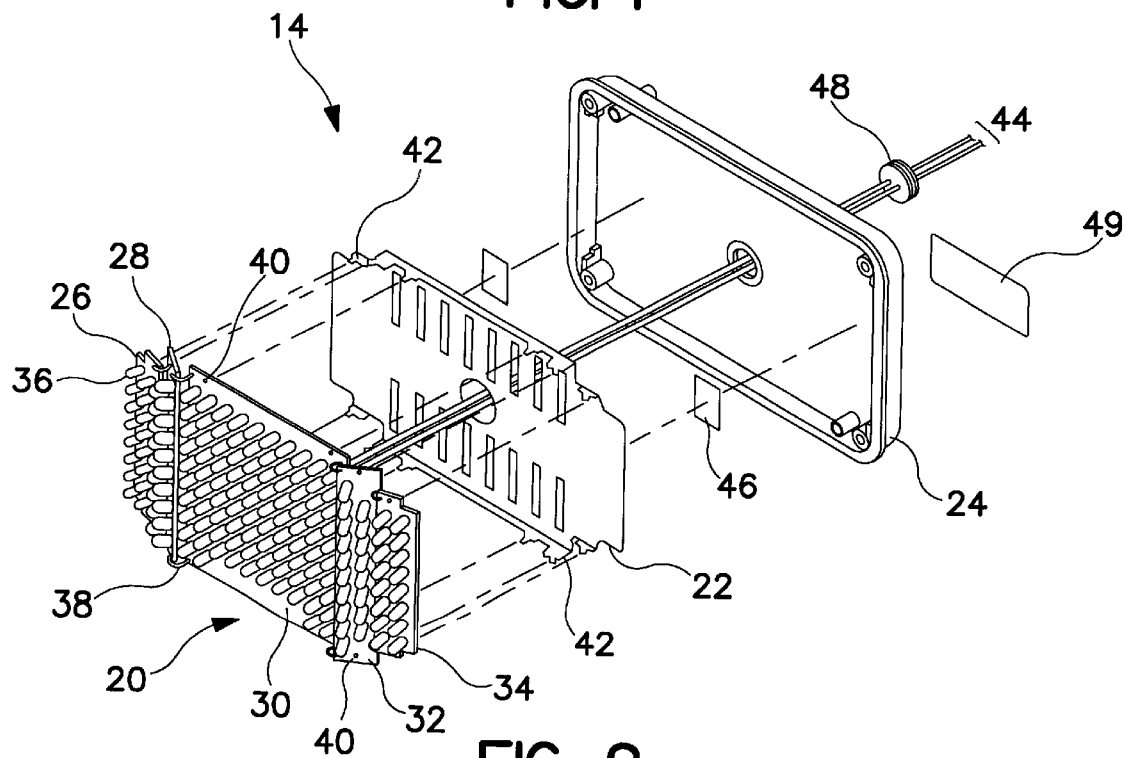
FIG. 2 is an exploded, perspective view of the light source of the warning light of FIG. 1.
Figure 3:
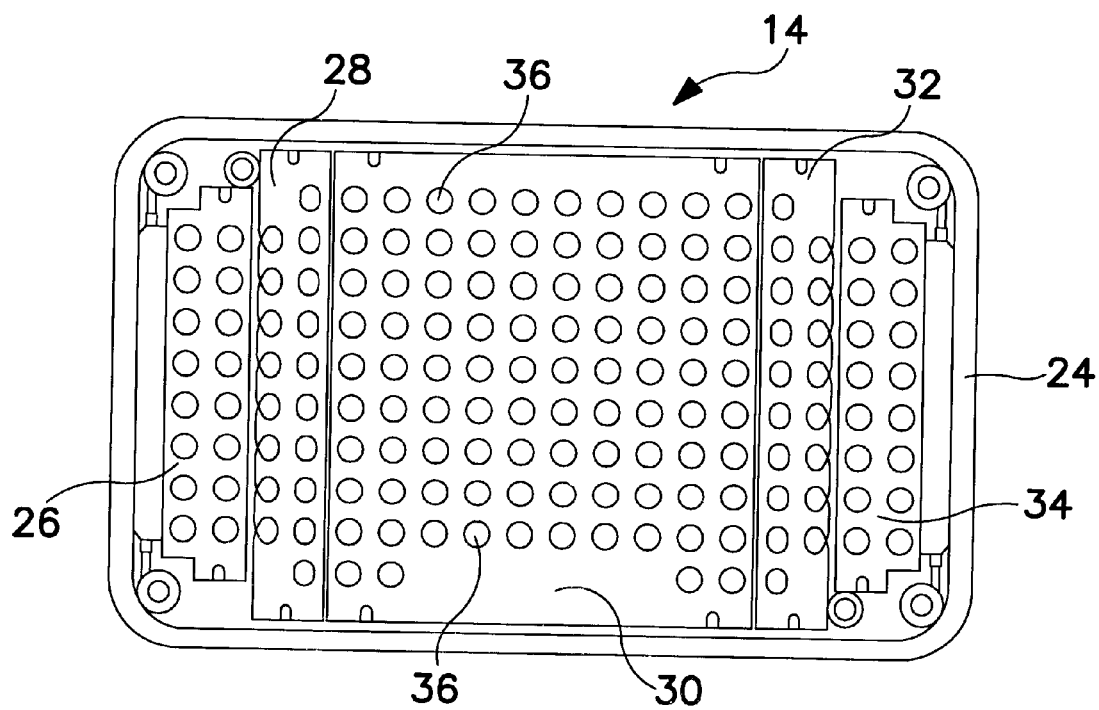
FIG. 3 is a front plan view of the light source of FIG. 2.

The light source 14 of FIG. 1 is shown in an exploded view, in FIG. 2, and in a front view, in FIG. 3. Light source 14 comprises a printed circuit board assembly, indicated generally at 20, a mounting bracket 22 and a molded plastic housing 24. In the embodiment of FIGS. 1–3, printed circuit board assembly 20, in the manner to be described in greater detail below, forms five planar sub-arrays of light emitting diodes. The bases for these sub-arrays are circuit board segments which have been indicated at 26, 28, 30, 32 and 34.

The individual LED's which generate the light emitted by light source 14 of warning light 10 have been identified by reference numeral 36. Each LED, as is well known in the art, comprises a die mounted in a cup, which acts as a reflector, and hermetically sealed by a plastic lens. In one reduction to practice of the embodiment being described, the LED's comprised commercially available AlInGaP devices. These devices are manufactured so as to have various output frequencies, "viewing" angles and intensity ratings. The viewing angle is the angle, measured with respect to the axis through the center of the lens of the device, where the light intensity has fallen to fifty (50%) percent of the on-axis intensity. The LED's 36 are mounted, with the axes of their lenses substantially parallel, on a printed circuit board with the integral lenses projecting forwardly from the front side of the board. The leads via which excitation current is supplied to diodes 36 extend through the board for connection to circuitry provided on the opposite or rearwardly facing side of the PC board. The printed circuitry on the PC board will establish series/parallel circuits which enable all of the LED's comprising a light source to be simultaneously energized from a single switched D.C. current source.

In the embodiments of FIGS. 1–3 and FIGS. 4–5, all of the LED's 36 comprising light source 14 will initially be mounted on a single PC board which will have been pre-scored to permit breaking into segments after the leads extending from the diodes have been soldered to the printed circuit. The PC board assembly 20 is provided with jumpers 38 which bridge the energizing current supply conductor discontinuities formed on the single board either by or in anticipation of the breaking of the PC board on the score lines. The jumpers 38 thus provide for the delivery of excitation current, via printed bus conductors, to all of the LED's 36 of sub-arrays 26, 28, 32 and 34.

After the PC board assembly 20 has been completed, i.e., after the LED's have been mounted and the original single PC board broken along the score lines to produce the board segments 26–34, the assembly 20 is affixed to bracket 22. In the embodiment of FIGS. 1–3, each of the PC board segments is provided with at least a pair of mounting holes 40 located adjacent the opposite ends thereof. The bracket 22 is provided with upper and lower flanges from which stepped tabs 42 protrude. The stepped tabs are positioned for engagement by the mounting holes in the board segments and have a shape and length which results in the board segments being firmly held in a desired orientation. Restated, the tabs 42 each define angled shoulders, which engage the rear side of a board segment, and a securing prong which extends through the board segment and is subsequently bent over to engage the front side of the board. Thus, when the PC board assembly 20 is mated with bracket 22 and the prongs on the tabs deformed to produce a unified structure, the planes defined by the individual board segments 26–34 will have predetermined angular relationships. These angular relationships, in cooperation with the selection of the LED's which populate the board segments 26–34, will produce a light source which meets a particular specification.

To further discuss the adjustment of the radiation pattern which may be achieved employing the present invention, in one reduction to practice four different type LED's were included on PC board assembly 20. In this reduction to practice, the outermost PC board segments 26 and 34 were populated with low intensity LED's having a viewing angle of ±30° while the intermediate board segments 28 and 32 were populated with high intensity LED's having a viewing angle of ±20°. The centerboard segment 30 was, in plural rows adjacent the opposite side edges, populated with high intensity LED's having a ±15° viewing angle. The four center most rows of LED's on board segment 30 were highest intensity devices with a ±8° viewing angle. All of LED's 36 were 5 mm AlInGaP$^2$ devices.

The combination of PC board assembly 20 and bracket 22, after attachment of the energizing current supply conductors 44 to the bus conductors on board segment 30, was encapsulated to produce a shock-proof structure which was then mounted in housing 24 by means of double-faced adhesive tape 46. The conductors 44 were passed through a grommet 48 which engaged housing 24 in such a manner as to preclude the penetration of moisture into the region behind the encapsulated board assembly/mounting bracket. The completed light source 14 is provided, on the surface thereof which faces gasket 16, with a further piece of double faced adhesive tape 49 which holds the gasket 16 in place prior to its being compressed during mounting of the light-head 10 in its intended use environment.

Figure 4:
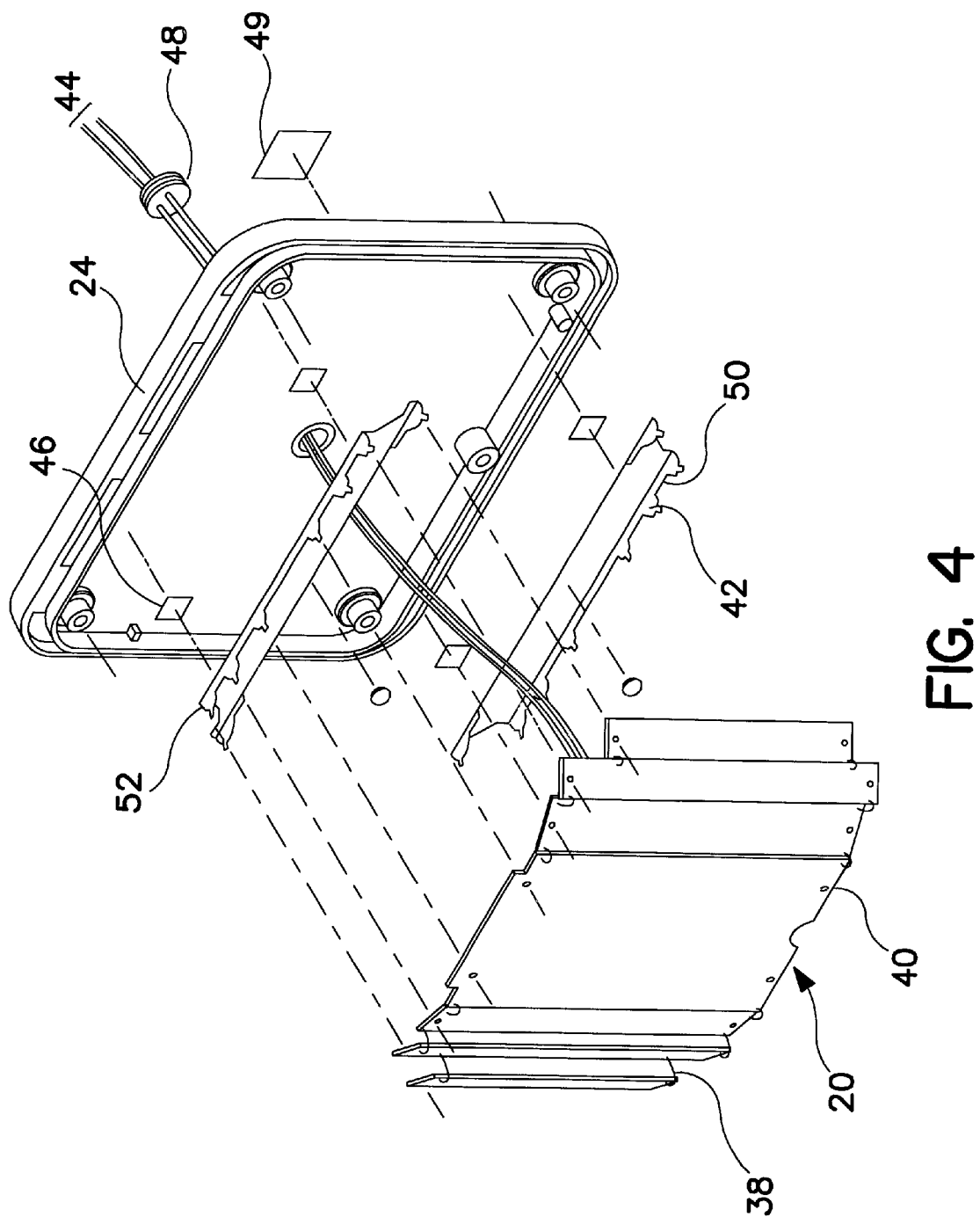
FIG. 4 is a view, similar to FIG. 2, depicting a modified form of light source, the individual active devices having been omitted from FIG. 4 in the interest of facilitating understanding of the invention.
Figure 5:
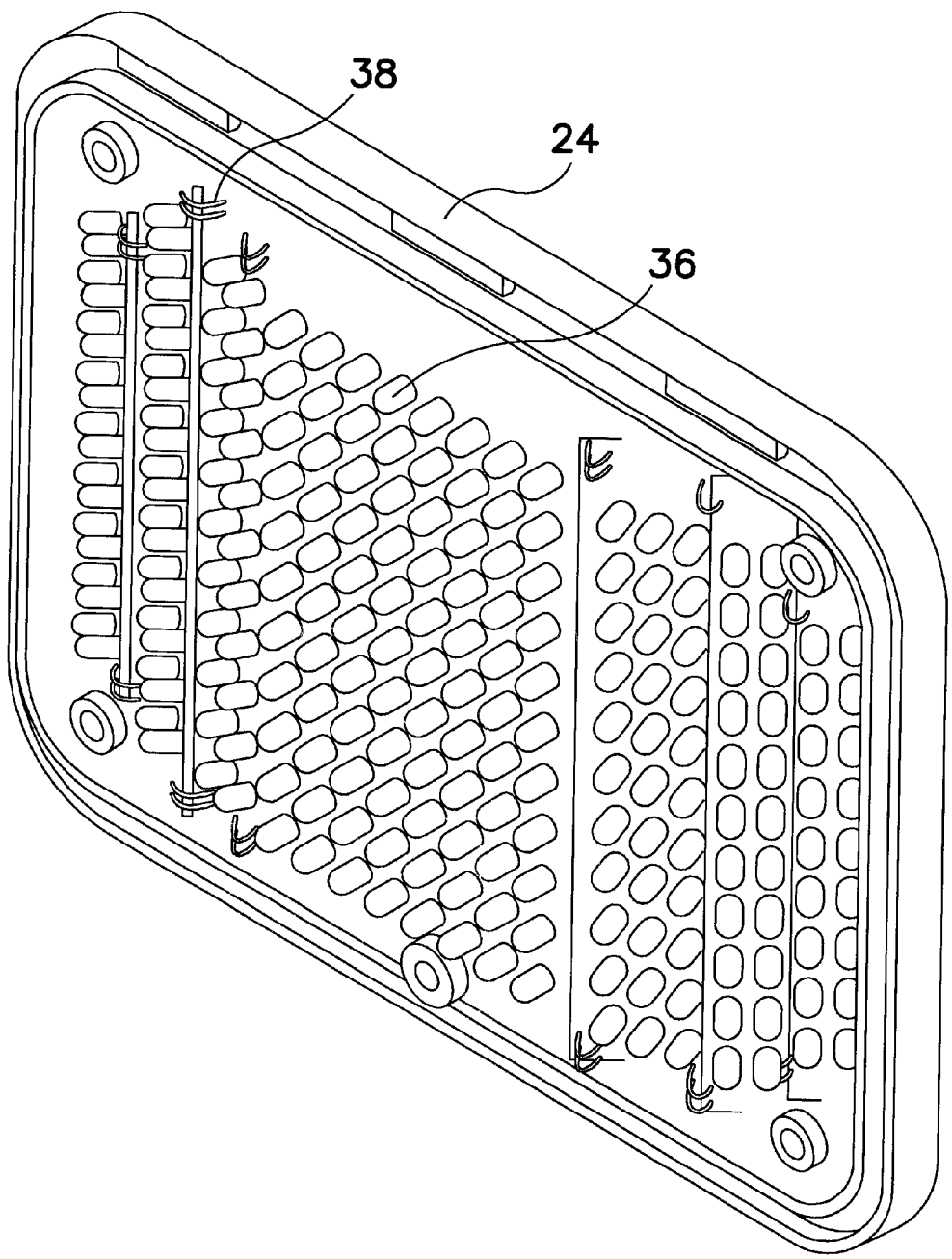
FIG. 5 is an enlarged perspective view of the light source of FIG. 4, including the light emitting diodes.

FIGS. 4 and 5 demonstrate the flexibility the present invention provides a lighthead designer. FIGS. 4 and 5 depict an embodiment employing seven PC board segments, rather than the five segments of the above-described embodiment. Another difference between the embodiment of FIGS. 4 and 5 and that of FIGS. 1–3 resides in the manner in which the PC board segments are secured in the proper angular relationship. In the FIGS. 4 and 5 embodiment, rather than employing a single bracket 22, a pair of generally U-shaped mounting channels 50 and 52 are utilized. FIG. 4, being on a somewhat enlarged scale when compared to FIG. 2, clearly shows the configuration of the stepped tabs 42 which engage and fix the angular orientation of the PC board segments. As can clearly be seen, each tab has a narrow, board engaging portion or finger which, after passing through the mounting hole 40 provided therefor, is bent over to secure the board segment in position. At the root of each of these board engaging fingers, the tabs are provided with oppositely directed shoulders which contact the rear surface of a board segment and provide a straight, i.e., flat, mounting surface against which the board segment is held.

In most emergency vehicle applications, the relevant lighthead specification calls for light which will be visible through a wide angle, typically 180°. For many non-emergency vehicle applications, however, the emitted light should not overlap light from other sources mounted on the same platform. For example, in a tail recognition light for an aircraft, the relevant specification calls for a white light which is constantly energized and has a viewing angle which does not exceed 140°. Restated, the field of illumination of a tail recognition light should not overlap the illumination fields of the red and green wing tip lights. Aircraft usage also dictates particular attention to the size, weight, power consumption, resistance to vibration induced damage and thermal emission characteristics of a light source. The present invention is highly suitable to the demanding environment of an aircraft.

Figure 6:
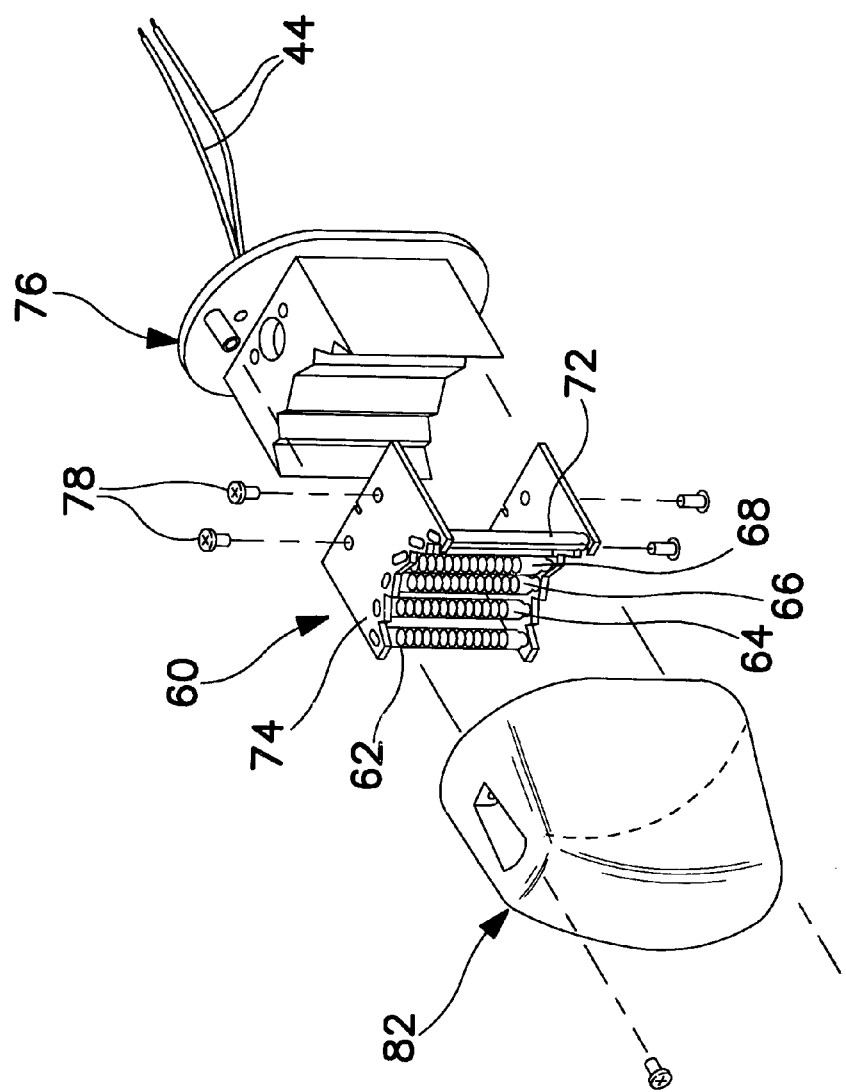
FIG. 6 is an exploded perspective view of an aircraft recognition light in accordance with the invention.

Referring to FIG. 6, an embodiment of a retrofitable aircraft tail recognition light in accordance with the invention is shown. Whereas, the light sources of the embodiments of FIGS. 1–3, and 4–5 are of generally convex shape, the light source 60 of the FIG. 5 embodiment has, in the interest of controlling the field of illumination, a generally concave configuration.

Light source 60 comprises six linear LED arrays 62–72, array 70 being hidden from view in the Figure. These LED arrays, like the above-described embodiments, each comprise a PC board segment having the active devices mounted thereon with their lens as extending forwardly therefrom. The PC board segments comprising the arrays of the FIG. 6 embodiment will typically be separately formed but could be separated from a single board as described above. The PC board segment arrays 62–72 are provided with projections 73 on the opposite ends thereof which are captured in plated-through slots provided therefor in a further pair of PC boards 74 which function as support/alignment plates. The projections 73 and the holes in the boards 74 are positioned and shaped to establish the desired angular relationship between the planes defined by the individual LED arrays. The arrays 62–72 are soldered in place and conductive paths for providing energizing current to the LED's are completed by the solder. Thus, in the FIG. 6 embodiment, the jumpers 38 are not required.

The light source 60, after establishment of the requisite electrical connections between the current supply conductors 44 and the bus conductors on the board segments, is affixed to a bracket 76. The attachment of the light source to bracket 76 is accomplished through the use of mechanical fasteners 78 which insure that a good heat transfer relationship is established between the bracket and PC boards 74. The power supply conductors 44 terminate at a connector.

The bracket 76 will customarily be fabricated from a material having a high thermal conductivity. This high thermal conductivity, coupled with the comparatively cool operating characteristics of the LED's and the efficient transfer of heat from arrays 62–72 to bracket 76 via PC boards 74, provides a lighthead which consumes a relatively low amount of electrical power and efficiently dissipates the relatively small amount of heat generated during operation. Thus, the lighthead comprising light source 60 and bracket 76 constitutes an ideal replacement for a lighthead employing an incandescent lamp. The lighthead of FIG. 6 has the further advantage of being virtually immune to damage through vibration since the light emitters do not include filaments. Additionally, since the use of LED arrays allows the above-described generally concave configuration, a lighthead in accordance with FIG. 6 has reduced stray light, i.e., the field of illumination may be controlled without the use of structures which are included solely to block light travelling in undesired directions.

A further advantage of a lighthead in accordance with the invention, particularly when designed for aircraft usage, is that the low amount of thermal energy to be dissipated permits the use of a plastic lens 82. Prior art aircraft recognition lights which employed incandescent light emitters have customarily employed a glass lens or dust cover because the necessary compactness of the lighthead coupled with the amount of heat produced would have resulted in damage, i.e., thermally induced discoloration, of a plastic lens.

As in the embodiments of FIGS. 1–3, and 4–5, the embodiment of FIG. 6 may be configured to meet an applicable specification by exercising control over the angular relationships between the individual LED arrays and by selection of the LED's employed to populate each of the board segments.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A high intensity light having a predetermined radiation pattern comprising:

a plurality of arrays of light emitting diodes, the diodes each having an integral lens which defines a viewing angle for emitted light, the diodes of each of said arrays being mounted on a separate support member with the axes of their lenses being substantially parallel, the said support member for each of said arrays defining a plane oriented substantially transverse to said axes;

means for establishing a predetermined spatial relationship between said arrays, said spatial relationship including a preselected angular orientation of each of said array support member defined planes, at least two of said planes being non-parallel and intersecting at an angle; and means for delivering energizing current to said diodes, wherein one of said arrays comprise at least two diodes each having a different viewing angle.

2. The light of claim 1, wherein each of said arrays comprises at least one row of diodes.

3. The light of claim 1, wherein said support members comprise printed circuit boards, said energizing current delivering means in part comprising conductors on said boards.

4. The light of claim 1 further comprising a light transmissive dust cover disposed to pass light emitted by all of said diodes.

5. The light of claim 1, wherein there are at least three of said arrays, said relationship establishing means positions said arrays in a serial arrangement with adjacent arrays being juxtapositioned to one another, and wherein the planes defined by the support members of adjacent arrays intersect at angles.

6. The light of claim 1, wherein said support members have opposite sides and opposite ends, and wherein said relationship establishing means engages said opposite ends of each of said support members.

7. The light of claim 1, further comprising a housing, said relationship establishing means being affixed to an interior surface of said housing.

8. The light of claim 7 further comprising a light transmissive dust cover, said dust cover being attached to said housing to provide a hermetically sealed lighthead wherein light emitted by said diodes will pass through said dust cover.

9. The light of claim 1 further comprising a mounting bracket affixed to said relationship establishing means, said bracket comprising a rigid material characterized by high thermal conductivity.

10. The light of claim 9, wherein said relationship establishing means comprises a pair of printed circuit boards, said energizing current delivering means in part comprising conductive paths on said boards.

11. The light of claim 5, wherein each of said arrays comprises at least one row of diodes.

12. The light of claim 11, wherein said support members comprise printed circuit boards, said energizing current delivering means in part comprising conductors on said boards.

13. The light of claim 12, wherein said printed circuit boards each have opposite sides and opposite ends, said sides of said boards being generally parallel in said serial arrangement, said relationship establishing means engaging said opposite ends of each of said boards.

14. The light of claim 13 further comprising a housing, said relationship establishing means being affixed to an interior surface of said housing.

15. The light of claim 14 further comprising a light transmissive dust cover, said dust cover being attached to said housing to provide a hermetically sealed lighthead wherein light emitted by said diodes will pass through said dust cover.

16. The light of claim 11, wherein said support members comprise printed circuit boards, said energizing current delivering means in part comprising conductors on said boards.

17. The light of claim 16, wherein said printed circuit boards each have opposite sides and opposite ends, said sides of said boards being generally parallel in said serial arrangement, said relationship establishing means engaging said opposite ends of each of said boards.

18. The light of claim 17 further comprising a light transmissive dust cover disposed to pass light emitted by all of said diodes.

19. The light of claim 18 further comprising a mounting bracket affixed to said relationship establishing means, said bracket comprising a rigid material characterized by high thermal conductivity.

20. The light of claim 19, wherein said relationship establishing means comprises a further pair of printed circuit boards.

21. The light of claim 3, wherein said circuit boards are segments of a unitary printed circuit, said unitary circuit having been subdivided along score lines to define said boards.

22. The light of claim 3, wherein said energizing current delivering means further includes jumper conductors which bridge the spaces between adjacent of said boards.

23. The light of claim 1, wherein each of said arrays comprises at least two rows of diodes.

24. The light of claim 15, wherein each of said arrays comprises at least two rows of diodes.

25. A method for manufacturing a warning light comprising the steps of:
providing a printed circuit board including a plurality of through-holes for receiving the electrical leads of a plurality of LEDs, said printed circuit board comprising circuitry connecting pre-selected groups of said through-holes;
providing LEDs having a plurality of different viewing angles;
providing electrical jumpers;
mounting selected LEDs to said printed circuit board so that one of said pre-selected groups includes at least two LEDs each having a different viewing angle;
mounting selected electrical jumpers to said printed circuit board to electrically connect the circuitry for each said pre-selected group with the circuitry of an adjacent pre-selected group so that all of said selected LEDs are electrically connected to receive electrical energy from a single source; and
separating said printed circuit board into sections,
wherein each said section supports one of said pre-selected groups and each said section remains electrically connected to an adjacent section by said electrical jumpers.

26. The method of claim 25, wherein said step of providing a printed circuit board further comprises the step of:
weakening said printed circuit board between said pre-selected groups to facilitate said step of separating.

27. The method of claim 25, further comprising the step of:
fixing said sections to a support structure where each said section is held in a pre-determined angular relationship to each other said section.

28. The method of claim 25, wherein said steps of mounting selected LEDs and mounting selected electrical jumpers comprise soldering said selected LEDs and selected jumpers to said circuitry.

29. The method of claim 26, wherein said step of weakening comprises scoring said printed circuit board.

30. The method of claim 26, wherein said step of weakening comprises perforating said printed circuit board.

31. A light source comprising:
a plurality of light producing arrays, each of said arrays comprising:
a support board; and
a plurality of LEDs, each LED having a lens defining an optical axis generally perpendicular to a support surface opposite the lens, said plurality of said LEDs being mounted to said support board with said support surfaces adjacent one side of said support board,
wherein the optical axes of said plurality of LEDs mounted to each support board collectively define a direction of light transmission for each of said arrays and said arrays are fixed in a concave configuration such that the direction of light transmission of each array intersects the direction of light transmission of each other array.

32. The light source of claim 31 wherein each said array has a longitudinal axis and comprises a single row of LEDs arranged along said longitudinal axis.

33. The light source of claim 32, wherein said arrays are fixed side by side with said longitudinal axes generally parallel to each other.

34. The light source of claim 31, comprising:
at least one alignment plate defining a plurality of through holes,
wherein each said support board comprises opposed projections and at least one of said projections from each support board are received in said plurality of through holes such that each of said plurality of support boards is held in a pre-established angular orientation relative to the other support boards.

35. The light source of claim 31, wherein each of said plurality of support boards includes circuitry for providing energizing current to the plurality of LEDs mounted to the support board and said at least one alignment plate comprises circuitry for delivering said energizing current to each of said arrays, a portion of each alignment plate defining each of said through holes being plated and said projections are soldered to said plated portions to establish an electrical connection between the circuitry of said support boards and the circuitry of said at least one support plate.

36. The light source of claim 34, wherein each said array has a longitudinal axis and comprises a single row of LEDs arranged along said longitudinal axis and said opposed projections are longitudinally separated, said at least one alignment plate comprises two alignment plates, with each said alignment plate substantially orthogonal to said longitudinal axes and receiving at least one projection from each said array.

37. The light source of claim 31, wherein each of said arrays emits stray light and stray light from each of said arrays is at least partially blocked by an adjacent array.

* * * * *